(12) United States Patent
Grange et al.

(10) Patent No.: US 10,362,329 B2
(45) Date of Patent: *Jul. 23, 2019

(54) VIDEO CODING USING REFERENCE MOTION VECTORS

(71) Applicant: Google Inc., Mountain View, CA (US)

(72) Inventors: Adrian William Grange, Los Gatos, CA (US); Ronald Sebastiaan Bultje, San Jose, CA (US); Yaowu Xu, Saratoga, CA (US); Paul Gordon Wilkins, Milton (GB)

(73) Assignee: GOOGLE LLC, Mountain View, CA (US)

( * ) Notice: Subject to any disclaimer, the term of this patent is extended or adjusted under 35 U.S.C. 154(b) by 333 days.

This patent is subject to a terminal disclaimer.

(21) Appl. No.: 15/338,554

(22) Filed: Oct. 31, 2016

(65) Prior Publication Data

US 2017/0048543 A1 Feb. 16, 2017

Related U.S. Application Data

(63) Continuation of application No. 13/974,678, filed on Aug. 23, 2013, now Pat. No. 9,485,515.

(51) Int. Cl.
*H04B 1/66* (2006.01)
*H04N 19/52* (2014.01)
*H04N 19/46* (2014.01)
*H04N 19/105* (2014.01)
*H04N 19/117* (2014.01)
*H04N 19/124* (2014.01)
*H04N 19/13* (2014.01)
(Continued)

(52) U.S. Cl.
CPC .......... *H04N 19/52* (2014.11); *H04N 19/105* (2014.11); *H04N 19/117* (2014.11); *H04N 19/124* (2014.11); *H04N 19/13* (2014.11); *H04N 19/159* (2014.11); *H04N 19/46* (2014.11); *H04N 19/61* (2014.11); *H04N 19/172* (2014.11); *H04N 19/176* (2014.11); *H04N 19/182* (2014.11); *H04N 19/184* (2014.11)

(58) Field of Classification Search
CPC ...... H04N 19/51; H04N 19/00; H04N 19/107; H04N 19/517; H04N 19/543
USPC ........................................................ 375/240
See application file for complete search history.

(56) References Cited

U.S. PATENT DOCUMENTS

2012/0307905 A1* 12/2012 Kim ...................... H04N 19/52
375/240.16

* cited by examiner

*Primary Examiner* — Jamie J Atala
*Assistant Examiner* — Masum Billah
(74) *Attorney, Agent, or Firm* — Young Basile Hanlon & MacFarlane, P.C.

(57) ABSTRACT

Techniques described use a reference motion vector to reduce the amount of bits needed to encode motion vectors for inter prediction. One method includes determining a reference motion vector used to encode a current block of a current frame. The reference motion vector was selected by identifying, multiple candidate motion vectors used to inter predict blocks, and identifying a set of reconstructed pixel values from at least one block adjacent to the current block. For each candidate motion vector, a set of predicted pixel values for the set of reconstructed pixel value is generated using the candidate motion vector and a first reference frame, and an error value is calculated based on a difference between the sets of pixel values. Finally, a reference motion vector from the candidates is selected based on the error values. The method also includes decoding the current block using the reference motion vector.

20 Claims, 9 Drawing Sheets

(51) Int. Cl.
*H04N 19/159* (2014.01)
*H04N 19/61* (2014.01)
*H04N 19/172* (2014.01)
*H04N 19/176* (2014.01)
*H04N 19/182* (2014.01)
*H04N 19/184* (2014.01)

VIDEO CODING USING REFERENCE MOTION VECTORS

CROSS REFERENCE TO RELATED APPLICATION

This application is a continuation of U.S. patent application Ser. No. 13/974,678, filed Aug. 23, 2013, the entire content of which is incorporated herein by reference.

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

BRIEF SUMMARY

This disclosure relates generally to encoding and decoding video data and more particularly relates to video coding using reference motion vectors. The teachings herein can reduce the number of bits required to encode motion vectors for inter prediction.

One implementation of an apparatus for decoding a video stream within an encoded bitstream includes a processor, and a memory storing instructions that cause the processor to determine a reference motion vector from the encoded bitstream that was used to encode a current block of a current frame and decode the current block using the reference motion vector. The reference motion vector is selected at an encoder by identifying, for previously-decoded blocks of the video stream, multiple candidate motion vectors used to inter predict the previously-decoded blocks, identifying a set of reconstructed pixel values from at least one decoded block adjacent to the current block within the current frame, for each candidate motion vector, generating, using the candidate motion vector and a first reference frame, a set of predicted pixel values for the set of reconstructed pixel values, and determining an error value based on a difference between the set of predicted pixel values and the set of reconstructed pixel values, and selecting, based on the error values, a reference motion vector from the candidate motion vectors.

Another implementation of an apparatus described herein is an apparatus for encoding a video stream into an encoded bitstream including a processor and a memory storing instructions. The instructions cause the processor to determine a reference motion vector by identifying, for previously-decoded blocks of the video stream, multiple candidate motion vectors used to inter predict the previously-decoded blocks, identifying a set of reconstructed pixel values from at least one decoded block adjacent to a current block within the current frame, for each candidate motion vector, generating, using the candidate motion vector and a first reference frame, a set of predicted pixel values for the set of reconstructed pixel values and determining an error value based on a difference between the set of predicted pixel values and the set of reconstructed pixel values, and selecting, based on the error values, a reference motion vector from the candidate motion vectors. The instructions further cause the processor to encode the current block into the encoded bitstream using the reference motion vector.

An example of a method for decoding a video stream within an encoded bitstream includes determining a reference motion vector within the encoded bitstream that was used to encode a current block of a current frame, and decoding the current block using the reference motion vector. The reference motion vector is selected at an encoder by identifying, for previously-decoded blocks of the video stream, multiple candidate motion vectors used to inter predict the previously-decoded blocks, identifying a set of reconstructed pixel values from at least one decoded block adjacent to the current block within the current frame, for each candidate motion vector, generating, using the candidate motion vector and a first reference frame, a set of predicted pixel values for the set of reconstructed pixel values and determining an error value based on a difference between the set of predicted pixel values and the set of reconstructed pixel values, and selecting, based on the error values, a reference motion vector from the candidate motion vectors.

Variations in these implementations and other aspects of the disclosure will be described in additional detail hereafter.

BRIEF DESCRIPTION OF THE DRAWINGS

The description herein makes reference to the accompanying drawings wherein like reference numerals refer to like parts throughout the several views.

DETAILED DESCRIPTION

Figure 1:
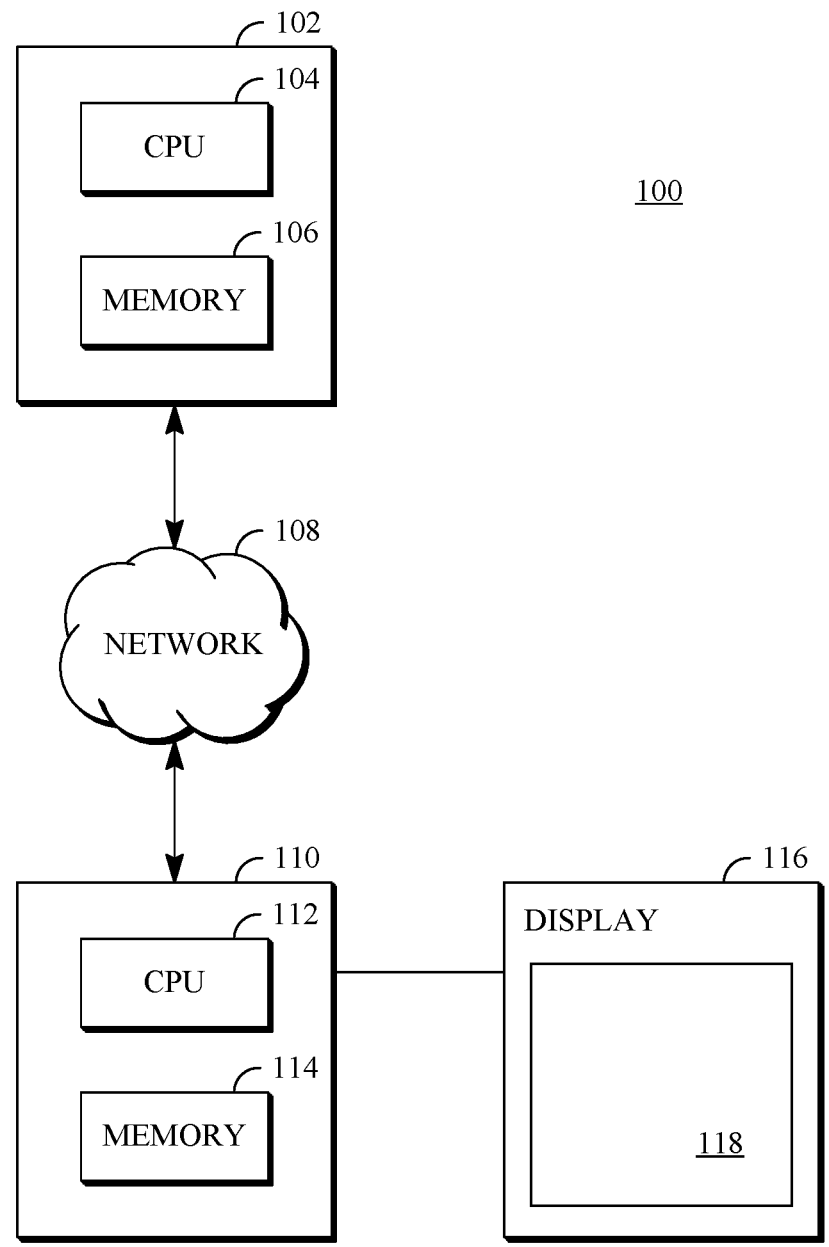
FIG. 1 is a schematic of a video encoding and decoding system in accordance with implementations of this disclosure.

Compression schemes related to coding video streams may include breaking each image into blocks and generating a digital video output bitstream using one or more techniques to limit the information included in the output. A received bitstream can be decoded to re-create the blocks and the source images from the limited information. Encoding a video stream, or a portion thereof, such as a frame or a block, can include using temporal and spatial similarities in the video stream to improve coding efficiency. For example, a current block of a video stream may be encoded based on a previously encoded block in the video stream by predicting motion and color information for the current block based on the previously encoded block and identifying a difference (residual) between the predicted values and the current block. In this way, only the residual and parameters used to generate it need be added to the bitstream instead of including the entirety of the current block. This technique may be referred to as inter prediction.

One of the parameters in inter prediction is a motion vector that represents the spatial displacement of the previously coded block relative to the current block. The motion vector can be identified using a method of motion estimation, such as a motion search. In motion search, a portion of a reference frame can be translated to a succession of locations to form a prediction block that can be subtracted from a portion of a current frame to form a series of residuals. The x- and y-translations corresponding to the location having the smallest residual can be selected as the motion vector. Bits representing the motion vector can be included in the encoded bitstream to permit a decoder to reproduce the prediction block and decode the portion of the encoded video bitstream associated with the motion vector.

For video compression schemes, the number of bits used to encode the motion vectors can be significant, especially for video streams encoded at lower data rates or higher compression ratios. To improve the encoding efficiency, a motion vector can be differentially encoded using a reference motion vector, i.e., only the difference between the motion vector and the reference motion vector is encoded. In some instances, the reference motion vector can be selected from previously used motion vectors in the video stream, for example, the last non-zero motion vector from neighboring blocks. Selecting a previously used motion vector to encode a current motion vector can further reduce the number of bits included in the encoded video bitstream and thereby reduce transmission and storage bandwidth requirements.

In implementations of this disclosure, a reference motion vector can be selected from candidate motion vectors based on a match score. For example, the match score can be based on the results of using candidate motion vectors (e.g., those used by previously decoded blocks) to predict a "trial" set of pixel values for those pixels close to the current block. Since the trial set has already been encoded and reconstructed, the predicted values can be compared against the corresponding reconstructed values to determine the match score. This permits the same procedure to take place at a decoder, where the reconstructed values would be available to calculate match scores before reconstructing the current block.

Due to the proximity of the current block to the pixels used in generating the trial set, it is likely in many cases that the current block has similar motion characteristics to those pixels. Thus, a candidate motion vector that generates the best predictor of the trial set may closely resemble the actual motion vector for the current block. For this reason, the motion vector of the candidate motion vectors that has the best match score may be selected as the reference motion vector for the actual motion vector of the current block. Fewer bits can be used to code the actual motion vector by coding the small difference in motion vectors, thus improving the overall coding efficiency. Other ways in which the selected motion vector may be used are discussed hereinafter.

The candidate motion vectors may be limited to spatial-temporal neighboring motion vectors. That is, the pool of candidate motion vectors may be selected from regions neighboring the current block. In some video coding schemes, particularly those where video frames are encoded out of order, it is desirable to include in the pool of candidate motion vectors motion information from video frames in the distant past or future. Encoding video frames out of order may occur, for example, in the coding of so-called "alternate reference frames" that are not temporally neighboring to the frames coded immediately before or after them. An alternate reference frame may be a synthesized frame that does not occur in the input video stream or is a duplicate frame to one in the input video stream that is used for prediction and is generally not displayed following decoding. Such a frame can resemble a video frame in the non-adjacent future. Another example in which out of order encoding may occur is through the use of a so-called "golden reference frame," which is a reconstructed video frame that may or may not be neighboring to a current video frame and is stored in memory for use as a reference frame until replaced, e.g., by a new golden reference frame.

Herein, alternate reference frames and golden reference frames (also called alternate frames and golden frames), in addition to adjacent video frames are used to infer motion vectors for a block of a frame of video data using pixels from the non-adjacent or adjacent video frames to predict reconstructed pixels spatially near the block to be predicted. Other details are described herein after first describing an environment in which the teachings herein may be implemented.

FIG. 1 is a schematic of a video encoding and decoding system 100 in which aspects of the disclosure can be implemented. A transmitting station 102 can be, for example, a computer having an internal configuration of hardware including a processor such as a central processing unit (CPU) 104 and a memory 106. The CPU 104 is a controller for controlling the operations of the transmitting station 102. The CPU 104 can be connected to the memory 106 by, for example, a memory bus. The memory 106 can be read only memory (ROM), random access memory (RAM) or any other suitable memory device. The memory 106 can store data and program instructions that are used by the CPU 104. Other suitable implementations of the transmitting station 102 are possible. For example, the processing of the transmitting station 102 can be distributed among multiple devices.

A network 108 connects the transmitting station 102 and a receiving station 110 for encoding and decoding of the video stream. Specifically, the video stream can be encoded in the transmitting station 102 and the encoded video stream can be decoded in the receiving station 110. The network 108 can be, for example, the Internet. The network 108 can alternatively or additionally comprise a local area network (LAN), wide area network (WAN), virtual private network (VPN), a cellular telephone network or any other means of transferring the video stream from the transmitting station 102 to, in this example, the receiving station 110.

The receiving station 110 can, in one example, be a computer having an internal configuration of hardware including a processor such as a CPU 112 and a memory 114. The CPU 112 is a controller for controlling the operations of the receiving station 110. The CPU 112 can be connected to the memory 114 by, for example, a memory bus. The memory 114 can be ROM, RAM or any other suitable memory device. The memory 114 can store data and program instructions that are used by the CPU 112. Other suitable implementations of the receiving station 110 are possible. For example, the processing of the receiving station 110 can be distributed among multiple devices.

A display 116 configured to display a video stream can be connected to the receiving station 110. The display 116 can be implemented in various ways, including by a liquid crystal display (LCD), a cathode-ray tube (CRT), or a light emitting diode display (LED), such as an organic LED (OLED) display. The display 116 is coupled to the CPU 112 and can be configured to display a rendering 118 of the video stream decoded in the receiving station 110.

Other implementations of the encoder and decoder system 100 are also possible. For example, an implementation can omit the network 108 and/or the display 116. A video stream can be encoded and then stored for transmission at a later time by the receiving station 110 or any other device having memory. In an implementation, the receiving station 110 receives (e.g., via the network 108, a computer bus, or some communication pathway) the encoded video stream and stores the video stream for later decoding. In another implementation, additional components can be added to the encoder and decoder system 100. For example, a display or a video camera can be attached to the transmitting station 102 to capture the video stream to be encoded.

Figure 2:
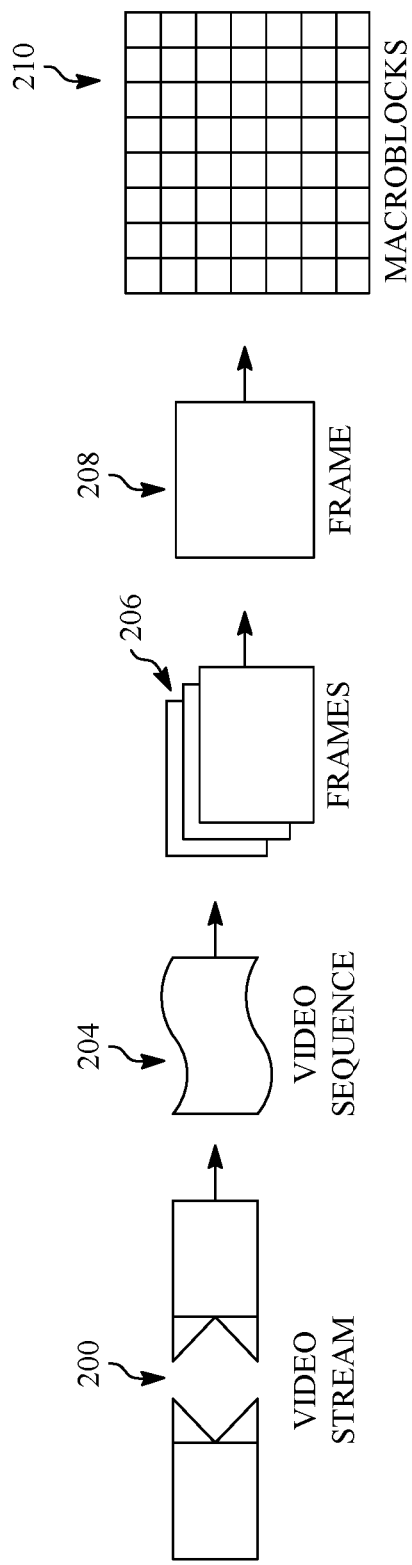
FIG. 2 is a diagram of an example of a video stream to be encoded and decoded in accordance with implementations of this disclosure.

FIG. 2 is a diagram of an example of a video stream 200 to be encoded and decoded. The video stream 200 (also referred to herein as video data) includes a video sequence 204. At the next level, the video sequence 204 includes a number of adjacent frames 206. While three frames are depicted as the adjacent frames 206, the video sequence 204 can include any number of adjacent frames. The adjacent frames 206 can then be further subdivided into individual frames, e.g., a frame 208. The frame 208 can capture a scene with one or more objects, such as people, background elements, graphics, text, a blank wall, or any other information.

At the next level, the frame 208 can be divided into a set of blocks 210, which can contain data corresponding to, in some of the examples described below, a 8×8 pixel group in the frame 208. A block 210 can also be of any other suitable size such as a block of 16×8 pixels, a block of 8×8 pixels, a block of 16×16 pixels, a block of 4×4 pixels, or of any other size. Unless otherwise noted, the term 'block' can include a macroblock, a subblock (i.e., a subdivision of a macroblock), a segment, a slice, a residual block or any other portion of a frame. A frame, a block, a pixel, or a combination thereof can include display information, such as luminance information, chrominance information, or any other information that can be used to store, modify, communicate, or display the video stream or a portion thereof.

Figure 3:
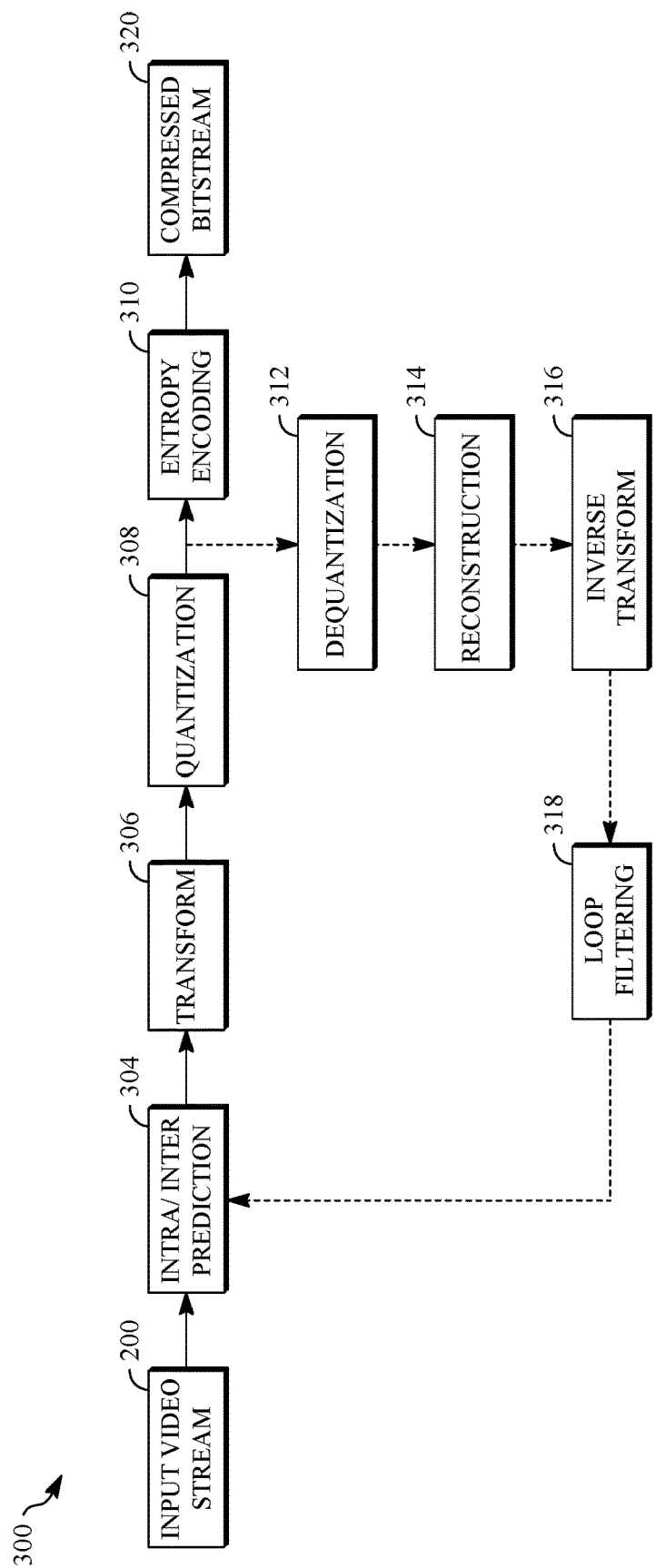
FIG. 3 is a block diagram of an encoder in accordance with implementations of this disclosure.

FIG. 3 is a block diagram of an encoder 300 in accordance with implementations of this disclosure. The encoder 300 can be implemented, as described above, in the transmitting station 102 such as by providing a computer software program stored in the memory 106, for example. The computer software program can include machine instructions that, when executed by the CPU 104, cause the transmitting station 102 to encode video data in the manner described in FIG. 3. The encoder 300 can also be implemented as specialized hardware in, for example, the transmitting station 102. The encoder 300 has the following stages to perform the various functions in a forward path (shown by the solid connection lines) to produce an encoded or a compressed bitstream 320 using an input video stream, such as the video stream 200: an intra/inter prediction stage 304, a transform stage 306, a quantization stage 308, and an entropy encoding stage 310. The encoder 300 may include a reconstruction path (shown by the dotted connection lines) to reconstruct a frame for encoding of future blocks. In FIG. 3, the encoder 300 has the following stages to perform the various functions in the reconstruction path: a dequantization stage 312, an inverse transform stage 314, a reconstruction stage 316, and a loop filtering stage 318. Other structural variations of the encoder 300 can be used to encode the video stream 200.

When the video stream 200 is presented for encoding, the frame 208 within the video stream 200 can be processed in units of blocks. Referring to FIG. 3, at the intra/inter prediction stage 304, each block can be encoded using either intra prediction (i.e., within a single frame) or inter prediction (i.e., from frame to frame). In either case, a prediction block can be formed. The prediction block is then subtracted from the block to produce a residual block (also referred to herein as residual).

Intra prediction (also referred to herein as intra-prediction or intra-frame prediction) and inter prediction (also referred to herein as inter-prediction or inter-frame prediction) are techniques used in modern image/video compression schemes. In the case of intra-prediction, a prediction block can be formed from samples in the current frame that have been previously encoded and reconstructed. In the case of inter-prediction, a prediction block can be formed from samples in one or more previously constructed reference frames, such as the last frame (i.e., the adjacent frame immediately before the current frame), the golden frame or the constructed or alternate frame described above.

The prediction block is then subtracted from the current block. The difference, or residual, is then encoded and transmitted to decoders. Image or video codecs may support many different intra and inter prediction modes; each block may use one of the prediction modes to obtain a prediction block that is most similar to the block to minimize the information to be encoded in the residual so as to re-create the block. The prediction mode for each block of transform coefficients can also be encoded and transmitted so a decoder can use the same prediction mode(s) to form prediction blocks in the decoding and reconstruction process.

The prediction mode may be selected from one of multiple intra-prediction modes. Alternatively, the prediction mode may be selected from one of multiple inter-prediction modes using one or more reference frames including, for example, last frame, golden frame, alternate reference frame, or any other reference frame in an encoding scheme. The inter prediction modes can include, for example, a mode (sometimes called ZERO_MV mode) in which a block from the same location within a reference frame as the current block is used as the prediction block; a mode (sometimes called a NEW_MV mode) in which a motion vector is transmitted to indicate the location of a block within a reference frame to be used as the prediction block relative to the current block; or a mode (sometimes called a NEAR_MV or NEAREST_MV mode) in which no motion vector is transmitted and the current block uses the last or second-to-last non-zero motion vector used by neighboring, previously coded blocks to generate the prediction block. Inter-prediction modes may be used with any of the available reference frames.

Next, still referring to FIG. 3, the transform stage 306 transforms the residual into a block of transform coefficients in, for example, the frequency domain. Examples of block-based transforms include the Karhunen-Loève Transform (KLT), the Discrete Cosine Transform (DCT), Walsh-Hadamard Transform (WHT), the Singular Value Decomposition Transform (SVD) and the Asymmetric Discrete Sine Transform (ADST). In one example, the DCT transforms the block into the frequency domain. In the case of DCT, the transform coefficient values are based on spatial frequency, with the lowest frequency (e.g., DC) coefficient at the top-left of the matrix and the highest frequency coefficient at the bottom-right of the matrix.

The quantization stage 308 converts the block of transform coefficients into discrete quantum values, which are referred to as quantized transform coefficients, using a quantizer value or quantization level. The quantized transform coefficients are then entropy encoded by the entropy encoding stage 310. The entropy-encoded coefficients, together with other information used to decode the block, which can include for example the type of prediction used, motion vectors and quantization value, are then output to a compressed bitstream 320. The compressed bitstream 320 can be formatted using various techniques, such as variable length encoding (VLC) and arithmetic coding. The compressed bitstream 320 can also be referred to as an encoded video stream and the terms will be used interchangeably herein.

The reconstruction path in FIG. 3 (shown by the dotted connection lines) can be used to provide both the encoder 300 and a decoder 400 (described below) with the same reference frames to decode the compressed bitstream 320. The reconstruction path performs functions that are similar to functions that take place during the decoding process that are discussed in more detail below, including dequantizing the quantized transform coefficients at the dequantization stage 312 to generate dequantized transform coefficients and inverse transforming the dequantized transform coefficients at the inverse transform stage 314 to produce a derivative residual block (i.e., derivative residual). At the reconstruction stage 316, the prediction block that was predicted at the intra/inter prediction stage 304 can be added to the derivative residual to create a reconstructed block. In some implementations, the loop filtering stage 318 can be applied to the reconstructed block to reduce distortion such as blocking artifacts.

Other variations of the encoder 300 can be used. For example, the encoder 300 can be a non-transform based encoder that quantizes the residual block directly without the transform stage 306. The encoder 300 can have the quantization stage 308 and the dequantization stage 312 combined into a single stage.

Figure 4:
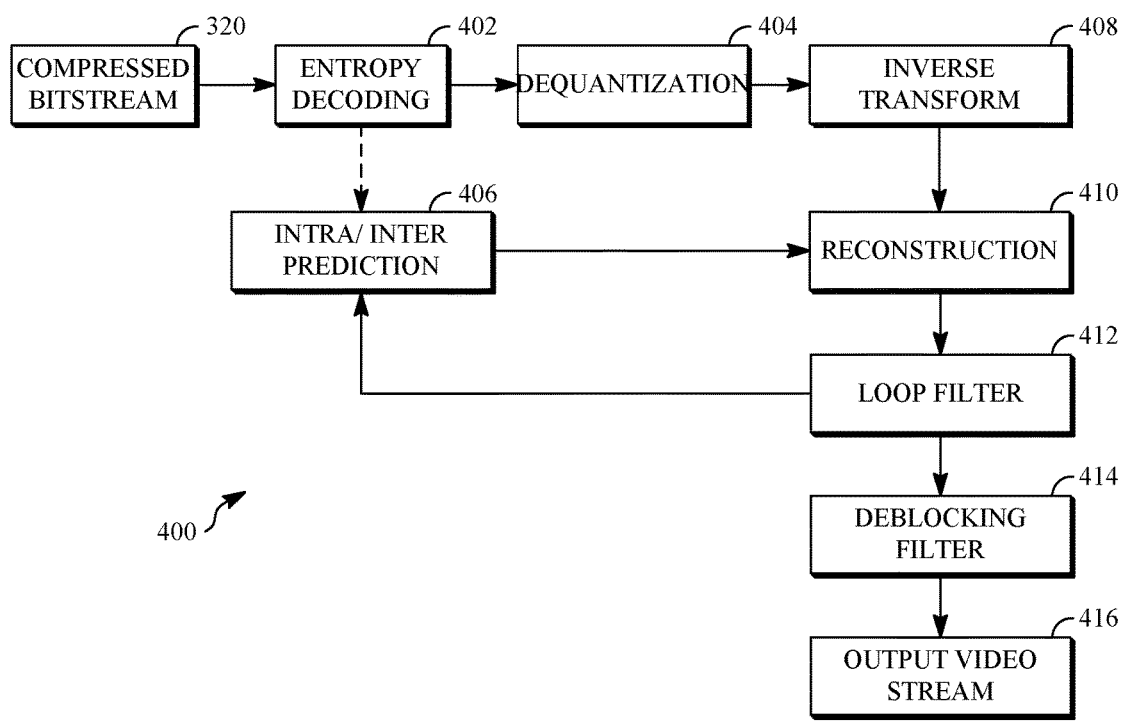
FIG. 4 is a block diagram of a decoder in accordance with implementations of this disclosure.

FIG. 4 is a block diagram of a decoder 400 in accordance with implementations of this disclosure. The decoder 400 can be implemented, for example, in the receiving station 110, such as by providing a computer software program stored in memory for example. The computer software program can include machine instructions that, when executed by the CPU 112, cause the receiving station 110 to decode video data in the manner described in FIG. 4. The decoder 400 can also be implemented as specialized hardware or firmware in, for example, the transmitting station 102 or the receiving station 110.

The decoder 400, similar to the reconstruction path of the encoder 300 discussed above, includes in one example the following stages to perform various functions to produce an output video stream 416 from the compressed bitstream 320: an entropy decoding stage 402, a dequantization stage 404, an inverse transform stage 406, an intra/inter prediction stage 408, a reconstruction stage 410, a loop filtering stage 412, and a deblocking filtering stage 414. Other structural variations of the decoder 400 can be used to decode the compressed bitstream 320.

When the compressed bitstream 320 is presented for decoding, the data elements within the compressed bitstream 320 can be decoded by the entropy decoding stage 402 (using, for example, arithmetic coding) to produce a set of quantized transform coefficients. The dequantization stage 404 dequantizes the quantized transform coefficients and the inverse transform stage 406 inverse transforms the dequantized transform coefficients to produce a derivative residual that can be identical or nearly identical to that created by the reconstruction stage 316 in the encoder 300. Using header information decoded from the compressed bitstream 320, the decoder 400 can use the intra/inter prediction stage 408 to create the same prediction block as was created in the encoder 300, e.g., at the intra/inter prediction stage 304. In the case of inter prediction, the reference frame from which the prediction block is generated may be transmitted in the bitstream or constructed by the decoder using information contained within the bitstream.

At the reconstruction stage 410, the prediction block can be added to the derivative residual to create a reconstructed block that can be identical or nearly identical to the block created by the reconstruction stage 316 in the encoder 300. In some implementations, the loop filtering stage 412 can be applied to the reconstructed block to reduce blocking artifacts. The deblocking filtering stage 414 can be applied to the reconstructed block to reduce blocking distortion, and the result is output as the output video stream 416. The output video stream 416 can also be referred to as a decoded video stream and the terms will be used interchangeably herein.

Other variations of the decoder 400 can be used to decode the compressed bitstream 320. For example, the decoder 400 can produce the output video stream 416 without the deblocking filtering stage 414.

Figure 5:
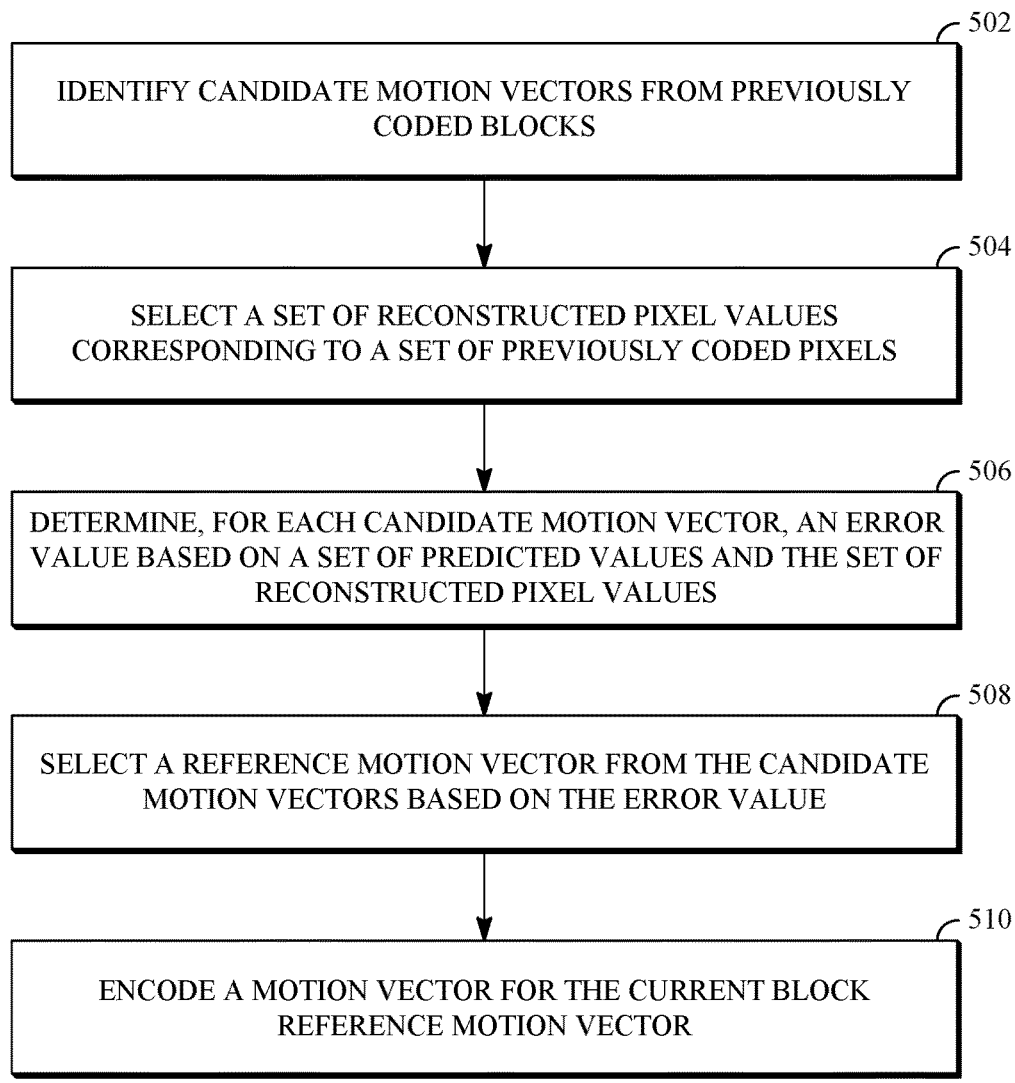
FIG. 5 is a flow diagram of a process for encoding a video stream using reference motion vectors in accordance with an implementation of this disclosure.

FIG. 5 is a flow diagram showing a process 500 for encoding a video stream using reference motion vectors in accordance with an implementation of this disclosure. The process 500 can be implemented in an encoder such as the encoder 300 (shown in FIG. 3) and can be implemented, for example, as a software program that can be executed by computing devices such as the transmitting station 102 or the receiving station 110 (shown in FIG. 1). For example, the software program can include machine-readable instructions that can be stored in a memory such as the memory 106 or the memory 114, and that can be executed by a processor, such as the CPU 104, to cause the computing device to perform the process 500.

The process 500 can be implemented using specialized hardware or firmware. Some computing devices can have multiple memories, multiple processors, or both. The steps of the process 500 can be distributed using different processors, memories, or both. Use of the terms "processor" or "memory" in the singular encompasses computing devices that have one processor or one memory as well as devices that have multiple processors or multiple memories that can each be used in the performance of some or all of the recited steps. For simplicity of explanation, the process 500 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

The process 500 assumes that a stream of video data having multiple frames, each having multiple blocks, is being encoded using a video encoder such as the video encoder 300 executing on a computing device such as the transmitting station 102. The video data or stream can be received by the computing device in any number of ways, such as by receiving the video data over a network, over a cable, or by reading the video data from a primary memory or other storage device, including a disk drive or removable media such as a CompactFlash (CF) card, Secure Digital (SD) card, or any other device capable of communicating video data. In some implementations, video data can be received from a video camera connected to the computing device operating the encoder. At least some of the blocks within frames are encoded using inter prediction as described in more detail below.

At 502, the process 500 identifies candidate motion vectors from previously coded blocks in the video stream. The previously coded blocks in the video stream can include any block encoded using inter-prediction before the current block, such as a block from a previously coded frame or a block from the same frame as the current block that has been encoded before the current block. For example, in some encoding/decoding (codec) schemes, such as ones that code in raster scan order, the previously coded blocks can include a block above, to the left, or to the above-left of the current block in the same frame. The previously coded blocks can also include, for example, a block from the immediately previous frame (i.e., the last frame), a block from the golden frame (described at the intra/inter prediction stage 304), a block from any other reference frame, or any combination thereof. Desirably, however, the candidate motion vectors are obtained from previously coded blocks that correspond in some way to the current block based on the theory that such blocks, due to the proximity of their pixels to the current block, are likely to have similar motion characteristics to the current block.

Figures 6, 7:
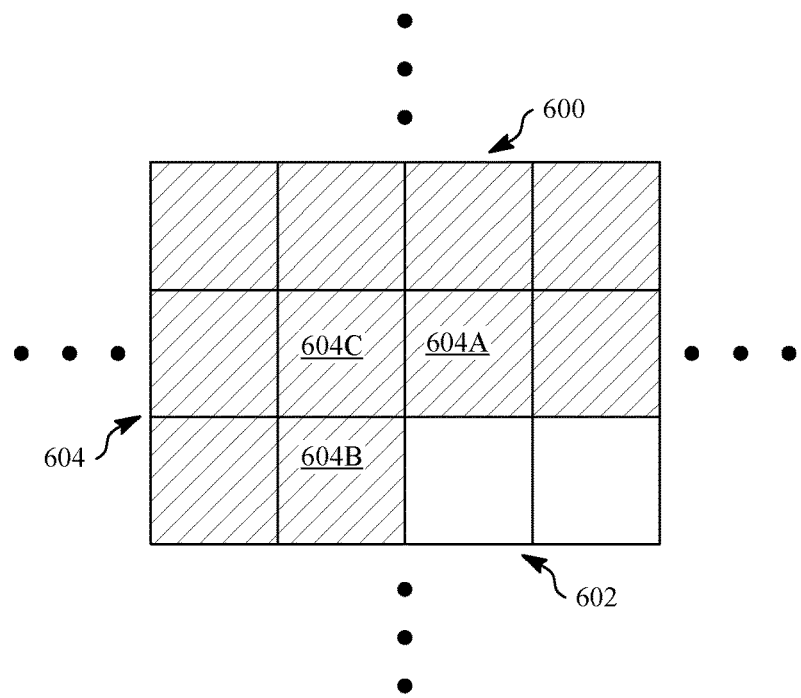
FIG. 6 is a diagram of a frame including a current block used to explain the process of FIG. 5.
FIG. 7 is a diagram of the current block of FIG. 6 and a set of previously coded pixels.

FIG. 6 is a diagram of a frame (also referred to as a current frame) 600 including a current block 602 used to explain the process 500 of FIG. 5. The frame 600 includes blocks that have been encoded before the current block 602, such as the shaded blocks 604 to the left of or above the current block 602 in FIG. 6. In this example where encoding is performed in raster scan order, the candidate motion vectors may include the motion vector from a block 604A above the current block 602, the motion vector from a block 604B to the left of the current block 602, and the motion vector from a block 604C to the above-left of the current block 602. If any of the blocks 604A, 604B or 604C was not inter predicted, they would not have a motion vector to contribute to the candidate motion vectors. The candidate motion vectors can also include motion vectors from other frames as illustrated by FIGS. 10 and 11.

Figure 10:
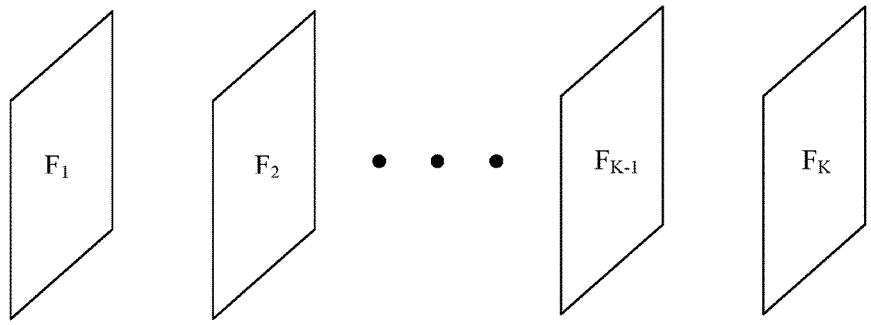
FIG. 10 is a diagram of a series of frames of a first video stream in accordance with an implementation of this disclosure.

FIG. 10 is a diagram of a series 1000 of frames $F_1$, $F_2 \ldots F_{k-1}$, $F_k$ of a first video stream in accordance with an implementation of this disclosure. The frame $F_k$ is the current frame to be encoded following encoding and reconstructing frames $F_1$, $F_2 \ldots F_{k-1}$. The frame $F_k$ includes the current block referred to in FIG. 5, for example. The frame $F_{k-1}$ is temporally adjacent to frame $F_k$, while frames $F_1$ and $F_2$ are temporally non-adjacent to frame $F_k$. A frame (e.g., a reference frame) is temporally non-adjacent to another frame when the frames are separated within a temporal sequence of the plurality of frames of the video stream by at least one frame. Among these video frames, the frame $F_2$ as reconstructed may be stored as a golden reference frame as discussed above. The frame $F_{k-1}$ is the reconstructed frame stored in a "last" reference frame buffer available for coding blocks of the current frame $F_k$. When encoding the frame $F_2$, the frame $F_1$ was used as the "last" reference frame. A block that spatially corresponds to the current block in the last frame $F_{k-1}$ may be used to obtain a motion vector for the candidate motion vectors at 502. That is, a motion vector used for the prediction of the block in the last frame $F_{k-1}$ at the same pixel location as the current block may be added to the candidate motion vectors. Motion vectors from other blocks in the last frame $F_{k-1}$, such as those adjacent to the same pixel location as the current block, may also be used as candidate motion vectors in some cases. Pixel locations may be designated by x- and y-coordinates with the top-left pixel designated as position (0,0) for example.

In the example of FIG. 10, the frame $F_2$ is a golden frame available for inter prediction of blocks in current frame $F_k$. Therefore, one or more of the adjacent blocks to the current block in the frame $F_k$ may refer to the frame $F_2$ such that its motion vector is included among the candidate motion vectors. Further, one or more motion vectors used for the prediction of the blocks in the frame $F_2$ as the golden frame may also be added to the candidate motion vectors. For example, a dominant motion vector of the frame could be selected. In some cases, motion vectors of inter predicted blocks in the frame $F_2$ within a specified spatial neighborhood of, for example, the same pixel position as the current block may be used as candidate motion vectors. Flags may be associated with the frame $F_k$ (such as bits in its header) to indicate that a motion vector used in coding the frame $F_2$ (e.g., against the frame $F_1$) is available to some blocks in the frame $F_k$ as a candidate motion vector.

Figure 11:
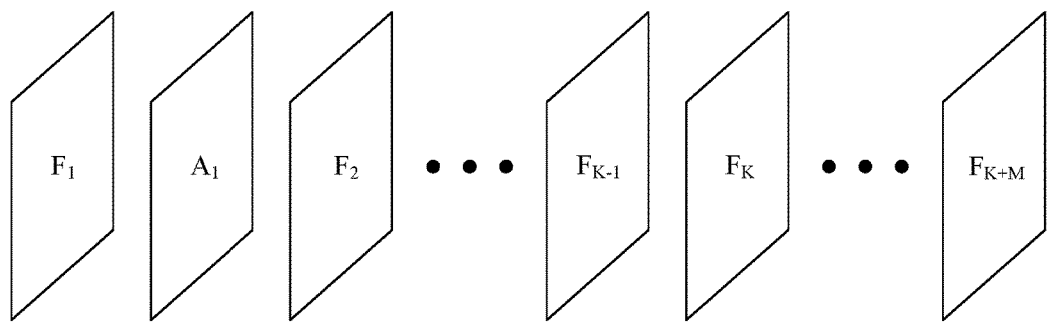
FIG. 11 is a diagram of a series of frames of a second video stream in accordance with an implementation of this disclosure.

FIG. 11 is a diagram of a series 1100 of frames $F_1$, $A_1$, $F_2$, \ldots $F_{k-1}$, $F_k$, \ldots $F_{k+m}$ of a second video stream in accordance with an implementation of this disclosure. The series 1100 is similar to the series 1000 but includes an alternate reference frame $A_1$. The alternate reference frames may be purely constructed frames and, as such, may not have the same dimensions as the remaining frames in the series 1100. For simplicity in this explanation, it is assumed that the frame A1 resembles a future video frame $F_{k+m}$. When encoding the frame $A_1$, motion vectors may be used against the last frame $F_1$ as a reference frame, for example. When it is time to encode the frame $F_k$, a motion vector from the frame $A_1$ after encoding and reconstruction can now be selected and identified to be used as a candidate motion vectors in encoding one or more blocks in the frame $F_k$. As discussed in the example given above with respect to the (e.g., golden) frame $F_2$, a motion vector to be included in the candidate motion vectors may be one associated with a spatially corresponding block of the alternate reference frame $A_1$ or one associated with another nearby block. Further, any of the blocks adjacent to the current block in the frame $F_k$ may refer to the frame $A_1$ such that the corresponding motion vector is included among the candidate motion vectors.

Referring again to FIG. 5, the process 500 includes selecting or identifying a set of reconstructed pixel values corresponding to a set of previously coded pixels at 504. In some implementations, the set of previously coded pixel values can include one or more rows of pixel values above the current block, or one or more columns of pixel values to the left of the current block, or both. The following examples are described using data in the two rows immediately above and the two columns immediately to the left of the current block. When the scan order is other than raster scan order, other adjacent pixels may be used. In other implementations, data from rows or columns not immediately adjacent to the current block, including data from blocks that are not adjacent to the current block, can be included in the set of previously coded pixel values. Due to the proximity of the set of previously coded pixel values to the current block, it is likely that the current block has similar motion characteristics as the set of previously coded pixel values. The set of reconstructed pixel values corresponding to the set of previously coded pixel values is available, for example, from the reconstruction path in FIG. 3 at the encoder 300.

FIG. 7 is a diagram of the current block 602 of FIG. 6 and a set 702 of previously coded pixels that may be identified at 504 in FIG. 5. The values of the set 702 form the set of reconstructed pixel values in step 504. The set 702 can include, for example, two rows 702A, 702B of pixels immediately above the current block 602 and two columns 702C, 702D of pixels to the immediate left of the current block 602. However, other previously coded pixels (not shown in FIG. 7) can also be used. The rows 702A, 702B are associated with the block 604A, while the columns 702C, 702D are associated with the block 604B. Blocks, such as the current block 602 and the previously-coded blocks 604A, 604B, are shown in FIG. 7 to have a set of 8×8 pixels, which can be represented by an 8×8 matrix of pixel values. However, any other block size can be used. When a block is formed by a matrix of 16×16 pixels, for example, a 16×2 region from the block above and a 2×16 region from the block to the left of the current block may be used. The number of pixels can be altered to include fewer or more pixels.

Each of the pixels in the rows 702A, 702B and the columns 702C, 702D has a reconstructed pixel value resulting from encoding and decoding the blocks 604A, 604B, respectively. Using these values, an error value (also called a match score) can be determined for the candidate motion vectors at step 504. To determine such an error value, a candidate motion vector may be used to generate predicted pixel values for the pixels of the rows 702A, 702B and the columns 702C, 702D for a comparison against the reconstructed pixel values. The motion vector is applied to the selected pixels, which produces predicted pixel values from a reference frame, and then the predicted pixel values are compared against the selected reconstructed pixel values to produce the error value for each motion vector. The process 500 at 504 can be implemented, for example, at the intra/inter prediction stage 306 of the encoder 300 in FIG. 3, and one implementation is explained using FIG. 8.

Figure 8:
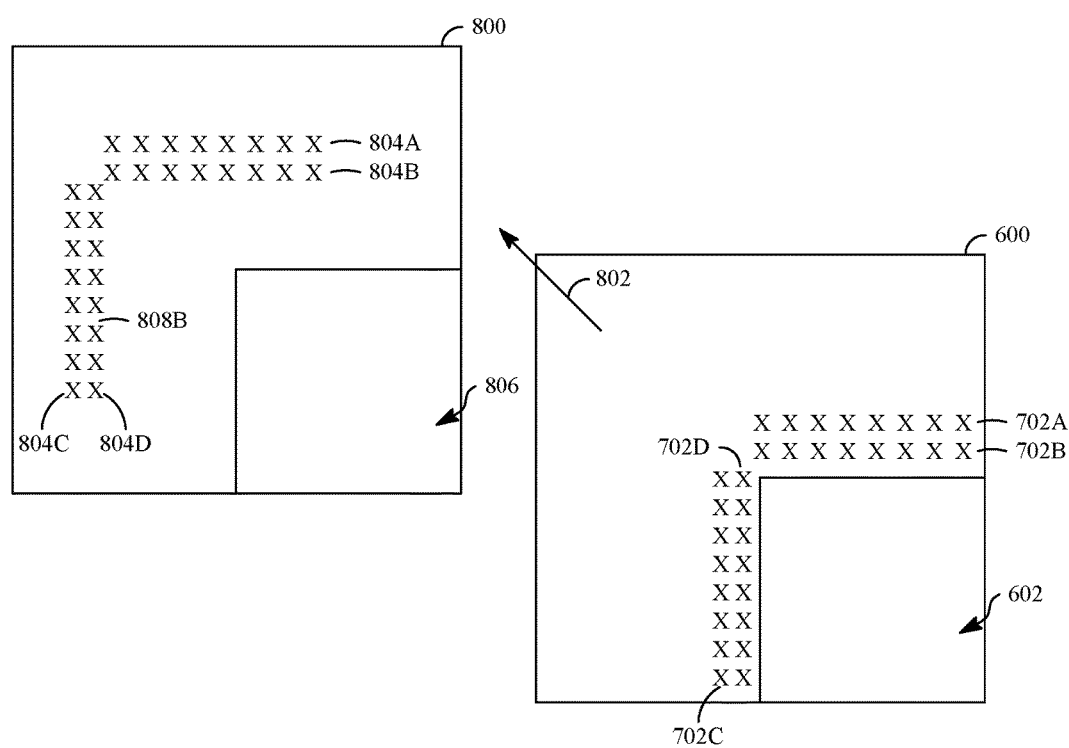
FIG. 8 is a diagram of a set of predicted pixels for the set of previously coded pixels of FIG. 7.

FIG. 8 is a diagram of a set of predicted pixels for the set of previously coded pixels 702 of FIG. 7. In FIG. 8, the current block 602 of the current frame 600 is being encoded. The set of predicted values is determined using a candidate motion vector (indicated generally by an arrow) 802 identified at 502. The set of previously coded pixels 702 includes, for example, the rows 702A, 702B and the columns 702C, 702D described above with reference to FIG. 7. To form the set of predicted values using the candidate motion vector 802, the rows 702A, 702B can be predicted by the rows 804A, 804B in a reference frame 800 and the columns 702C, 702D can be predicted by the columns 804C, 804D in the reference frame 800. That is, using the x- and y-offsets provided by the candidate motion vector 802, a set of predicted pixels represented by the rows 804A, 804B and the columns 804C, 804D in the reference frame 800 is identified. The values of the predicted pixels form the set of predicted values for comparison with the set of reconstructed pixel values of the pixels of the rows 702A, 702B and the columns 702C, 702D. Once the set of predicted values is identified, the error value can be determined for the candidate motion vector 802 by the comparison. In FIG. 8, the block 806 is shown in the same spatial position in the reference frame 800 as the current block 602 is in the current frame 600 to illustrate the pixels of the rows 804A, 804B and the columns 804C, 804D selected as the prediction pixels based on the candidate motion vector.

More generally, determining error values for motion vectors acquired from reference frames either temporally adjacent or temporally non-adjacent to the current frame includes using the motion vectors to translate pixels from a reference frame to positions coincident with the set of reconstructed pixels spatially near the current block from the current frame to be predicted. A comparison may be performed by subtracting the translated pixel values from the reconstructed pixel values. The residual or difference for each set of pixel values may be combined to produce a match score or error value that represents the magnitude of the residual summed, the absolute values summed, the squared differences summed or the differences averaged, the absolute values of the differences averaged or any other technique for arriving at a relative magnitude of the residuals.

The error value can be determined using metrics such as sum of absolute differences (SAD), sum of squared error (SSE), mean squared error (MSE), or any other error metric. For example, when SAD is used, the set of predicted values can be compared against the set of reconstructed pixel values to determine a SAD value for each motion vector. In some implementations, different weights can be associated with different pixels in the set of previously coded pixel values. For example, more weight can be given to the row or column of pixels immediately adjacent to the current block, or less weight can be given to the row or column of pixels further away from the current block. Error values may be similarly determined for each candidate motion vector and each possible reference frame as described below.

The reference frame used for the identification of the prediction values at 506 may be a temporally adjacent frame (such as the last frame $F_{k-1}$) or a temporally non-adjacent frame (such as the golden frame $F_2$ or the alternate frame $A_1$). Desirably, each available reference frame is used as part of a rate-distortion loop within an encoder that determines the best coding mode for the current block by comparing the rate (e.g., the bit cost) of each coding mode with the resulting image distortion (e.g., the change in image due to the coding) for each tested mode. However, since the candidate motion vectors may be generated using frames separated by different temporal distances than the current frame and the particular reference frame under consideration. Accordingly, the process 500 at 506 may also include scaling candidate motion vectors where needed, which is described by reference again to FIGS. 10 and 11.

Scaling up or down a motion vector so that it may be applied as a candidate motion vector means adjusting its magnitude. The magnitude of the candidate can be scaled depending upon the results of comparing the temporal distance and direction between the reference frame and the frame including the current block and the temporal distance and direction used to form the candidate motion vector. The temporal distance between frames can be determined by their respective positions in the video stream. For example, when a candidate motion vector is a motion vector that was used to encode a block of the frame $F_2$ against the frame $F_1$, the magnitude of the motion vector can be used directly for encoding the frame $F_k$ against the reference frame $F_{k-1}$ since the frames $F_k$ and $F_{k-1}$ are, like the frames $F_1$ and $F_2$, a frame apart temporally (that is, they are adjacent frames in the frame sequence). In contrast, a candidate motion vector from the frame $F_{k-1}$ and previous coded blocks of the frame $F_k$ when a block of the frame $F_k$ was encoded using the golden frame, i.e., the frame $F_2$ in FIGS. 10 and 11, is scaled to take into account the difference of temporal distance before being used to generate the prediction pixels at 506. For example, a motion vector used in previously coding a block of the current frame $F_k$ against the frame $F_{k-1}$ will be scaled up using a factor proportional to k–2 to become a candidate motion vector for generation of the prediction pixels when the current block, such as the current block 602 of FIG. 8, is in evaluation to be coded against the reference frame $F_2$. Scaling up or down a motion vector so that it may be applied as a candidate motion vector means adjusting its magnitude. The magnitude of the candidate can be scaled depending upon the results of comparing the temporal distance and direction between the reference frame and the frame including the current block and the temporal distance and direction used to form the candidate motion vector.

An alternate reference frame such as the frame $A_1$ may be treated similarly to other reference frames, such as the last or golden reference frame. However, since an alternate reference frame may be constructed using portions of multiple frames from multiple temporal positions in the video stream, techniques may be used to determine a temporal position in the video stream that most closely matches the image data included in the alternate frame.

This can be explained further using an example from FIG. 11 assuming the use of a candidate motion vector used to predict a block in the current frame $F_k$ from the frame $A_1$ to generate prediction pixels for analysis of the current block using the reference frame $F_{k-1}$. Because the distance in frames between the frames $F_1$ and $A_1$, where the frame $A_1$ actually resembles the frame $F_{k+m}$, is k+m–1, the motion vector magnitude may be divided by k+m–1 before using the candidate motion vector to generate the prediction pixels. This is because the distance between the frames $F_k$ and $F_{k-1}$ is less than the distance k+m–1, therefore the motion vector is scaled down to approximate the motion between the frames $F_k$ and $F_{k-1}$. In cases where the motion vectors are taken from frames temporally close together and used to form inter prediction pixels from frames with greater temporal separation, the motion vectors can be multiplied by a scaling factor proportional to the ratio of the two temporal distances.

At 508, a reference motion vector can be selected from the candidate motion vectors identified at 504. The selection can be based on, for example, selecting the motion vector from the candidate motion vectors associated with the best match score, which can be, for example, the motion vector with the lowest error value among all the candidate motion vectors generated at 506. Other selection criteria can also be used. For example, if it is determined that the candidate motion vector 802 has the lowest error value among the candidate motion vectors, the candidate motion vector 802 can be selected as the reference motion vector, which can be used for further processing. Namely, the motion vector of the current block can be encoded using the reference motion vector at 510 before processing begins again for the next block of the current frame. In addition, the current block can be encoded according to the process described with respect to FIG. 3.

There are several ways to use the reference motion vector in encoding the motion vector of the current block. For example, and as described above, the process 500 may be part of a rate-distortion loop used to select the inter prediction mode for the current block to be encoded. As part of the rate-distortion loop, the actual motion vector for inter prediction of the current block may be determined through a motion search according to any number of techniques. One use of the reference motion vector may include using the reference motion vector as a starting parameter for the motion search algorithm based on the reasoning that the actual motion vector is likely to be close to those used in selecting the reference motion vector. A motion search may alternatively be performed before or in parallel with the process 500.

Whether or not the reference motion vector is incorporated into the motion search, the process 500 at 510 may include using the reference motion vector to differentially encode the actual motion vector. For example, a difference value can be calculated by subtracting the reference motion vector from the motion vector used to encode the current block. The difference value can be encoded and included in the video stream. Since the reference motion vector was formed using previously encoded and decoded data, the same data can be available at a decoder to identify the same reference motion vector as was used in forming the motion vector at the encoder, thus no motion vector is required to be encoded and transmitted for the current block. The decoded difference value can be added to the reference motion vector identified by the decoder as described below to form a motion vector to decode the current block. Note that the reference motion vector is associated with one of the available reference frames used to generate the set of predicted values and hence the error value. Therefore, in the event the reference motion vector is associated with a reference frame that is different from the reference frame associated with the actual motion vector, the reference motion vector may be scaled as described previously so as to generate the difference between the reference motion vector and the actual motion vector. In some implementations, a separate indication of the reference frame used would also be encoded into the bitstream.

In another implementation, the reference motion vector may be used to choose a probability distribution to encode the magnitude of the motion vector used to encode the current block. In this implementation, bits can be included in the video stream to identify the encoded magnitude of the motion vector and which predetermined probability distribution to use to form the motion vector based on the encoded magnitude. One or more bits indicating which reference frame to use in decoding the current block may also be included in the bitstream in some variations. Like its use in differential encoding, the reference motion vector may also be scaled to the extent it is desirable.

In an implementation, the reference motion vector may also be used directly in the encoding of the current block. This can occur, for example, when a comparison of the rate-distortion value involved in coding the current block using the motion vector determined by the motion search is higher than that involved in coding the current block using the reference motion vector. In this comparison, the reference frame used would desirably be the one used in selecting the reference motion vector so no scaling is needed. In some cases, the decision as to whether or not use the reference motion vector may be tied to the difference between the reference motion vector and the motion vector resulting from the search. When the difference is small (or zero), the difference in prediction results for the reference frame resulting from the search using the reference motion vector versus the actual motion vector is also small (or zero). When the reference motion vector is used directly to encode the current block, no motion vector would need to be separately encoded at 510. Instead, one or more bits would be inserted into the bitstream in association with the current block to indicate use of the reference motion vector for encoding.

In each of the above ways, the use of a reference motion vector may reduce the number of bits needed to represent the motion vector needed to decode an inter-coded block. In some cases, the motion vector used for encoding the current frame would not be separately. Bits may be inserted into frame, slice and/or block headers indicating whether reference motion vectors are used and how they are used for encoding the current block. When applicable, the motion vector found by the motion search or the motion vector differential and/or the reference frame used in encoding the current block are also transmitted.

Regardless of the motion vector used for encoding, a prediction block can be determined based on a reference frame by applying a candidate motion vector to the previously coded pixel values of the reference frame. The prediction block can be subtracted from the current block to form a residual that can be further encoded according to the processing described with respect to FIG. 3 and included in an encoded video bitstream.

Figure 9:
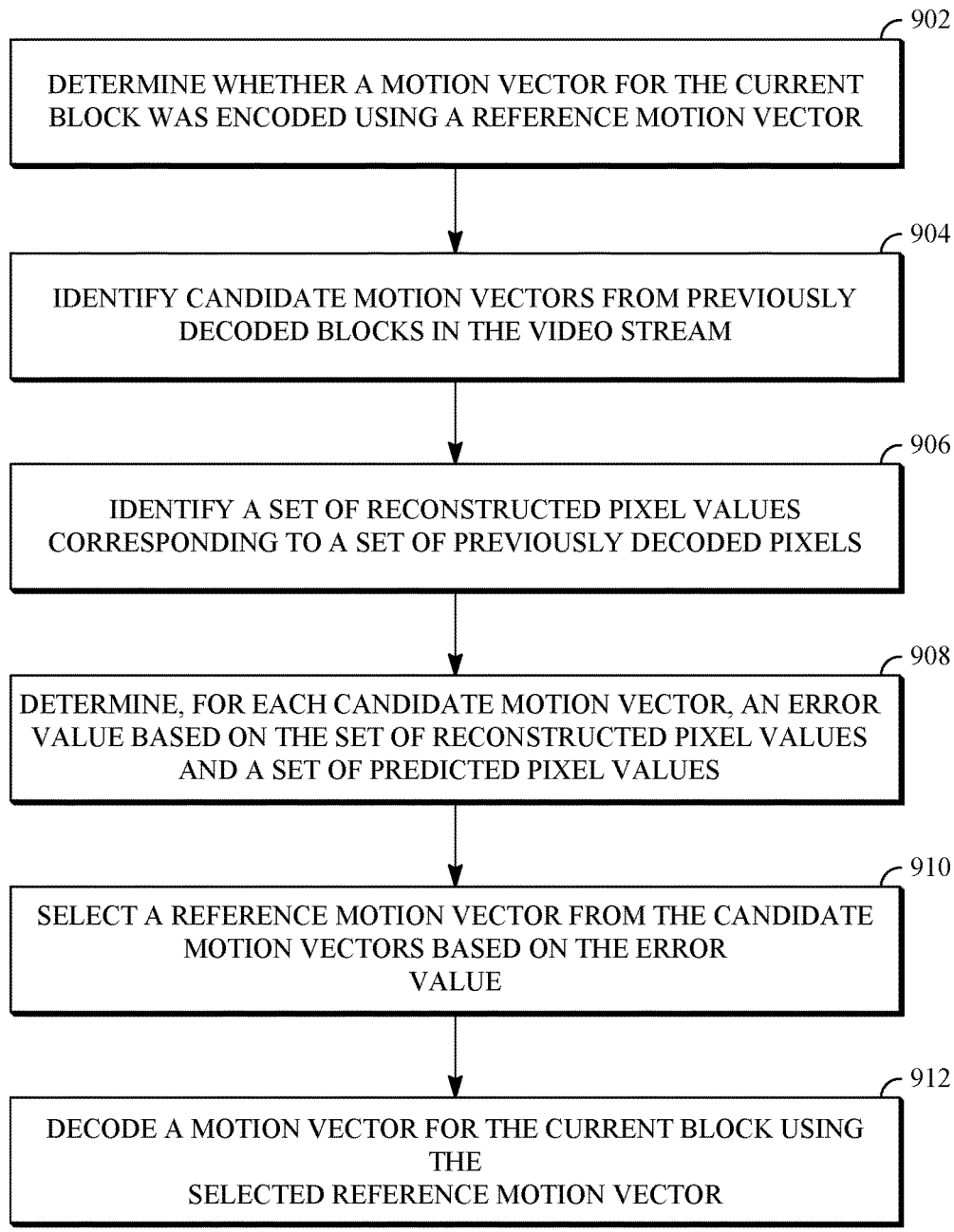
FIG. 9 is a flow diagram of a process for decoding an encoded video stream using reference motion vectors in accordance with implementations of this disclosure.

FIG. 9 is a flow diagram of a process 900 for decoding an encoded video stream using reference motion vectors in accordance with implementations of this disclosure. The process 900 can be implemented, for example, as a software program that may be executed by computing devices such as the transmitting station 102 or the receiving station 110. For example, the software program can include machine-readable instructions that may be stored in a memory such as the memory 106 or 114, and that, when executed by a processor, such as the CPU 104 or 112, may cause the computing device to perform the process 900. The process 900 can be implemented using specialized hardware or firmware. As explained above, some computing devices may have multiple memories or processors, and the steps of the process 900 can be distributed using multiple processors, memories, or both.

For simplicity of explanation, the process 900 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

Desirably, the process 900 substantially conforms to the process 500. There are some differences, however, that are pointed out in the following description of the process 900. Where steps are substantially similar to those in the process 500, reference will be made to the description above.

At 902, the decoder determines whether the motion vector for the current block was encoded using a reference motion vector. This information can be communicated by reading and decoding bits from an encoded video bitstream that indicate the use of a reference motion vector according to one of the techniques disclosed above. The encoded bitstream (or encoded video data) may have been received by decoder of a computing device in any number of ways, such as by receiving the video data over a network, over a cable, or by reading the video data from a primary memory or other storage device, including a disk drive or removable media such as a DVD, CompactFlash (CF) card, Secure Digital (SD) card, or any other device capable of communicating a video stream. The process 900 at 902 involves decoding at least a portion of the encoded video bitstream to extract the information regarding the motion vector for the current block. This information can be included in a header associated with a current block or a frame header, for example. The information in the one or more headers indicate to the decoder that the current block is to be decoded using inter prediction and that the motion vector used for that inter prediction relies on the reference motion vector as described previously. For example, information in the bitstream could indicate that the actual motion vector used in encoding the current block was differentially encoded using the reference motion vector. Alternatively, information could indicate that the reference motion vector was used directly for encoding the current block.

When a reference motion vector was used in the encoder to encode the motion vector for the current block, the process 900 advances to 904 to identify candidate motion vectors from previously decoded blocks. The identified candidate motion vectors should be the same as those identified by the encoder at 502, which may be accomplished by flags as described previously and/or by a priori rules regarding the selection of candidate motion vectors that are available to both the encoder and decoder based on the position of the current block.

At 906, a set of reconstructed pixel values corresponding to a set of previously decoded pixels is selected or identified at step 906. The set of pixels corresponds to the set of pixels used at 504 in the process 500 of FIG. 5. Thus, the set of reconstructed pixel values at 906 is the same as the set of reconstructed pixel values at 504.

At 908, an error value can be determined each candidate motion vector based on the set of reconstructed pixel values and a set of predicted values for the set of previously decoded pixel values associated with the candidate motion vector as described above with respect to 506 in the process 500 of FIG. 5. Using the error values for each candidate motion vector and each reference frame, the reference motion vector is selected in the same manner as at 508 in the process 500 of FIG. 5, such as by selecting the candidate motion vector (and associated reference frame) with the lowest error value.

Once the reference motion vector is selected, the motion vector used to encode the current block can be decoded using the selected reference motion vector at 912. The decoded motion vector may then be used to decode the current block according to the process described with regard to FIG. 4.

In one example of the implementation at 912, if the reference motion vector is used to differentially encode the actual motion vector for the current block, the decoder can decode the motion vector by, for example, decoding an encoded difference value that can then be added to the reference motion vector selected at 910 to generate the actual motion vector. Then, the actual motion vector may be used to decode the current block using inter prediction. In other implementations, the reference motion vector can be used to identify a predetermined probability distribution, which can be used to decode a magnitude value of the motion vector used to encode the current block before decoding the current block using the motion vector. Similar to the discussion at 510 in the process 500 of FIG. 5, this may involve scaling the reference motion vector. In other implementations, the reference motion vector may be used directly as the motion vector to decode the current block after decoding one or more bits indicating that the reference motion vector should be so used.

Once the motion vector and current block are decoded at 912, the next block may be processed. If the next block is inter-coded, the process 900 may be repeated. A frame can be reconstructed from the blocks derived from reconstructed values by intra or inter prediction, or both. The output can be an output video stream, such as the output video stream 416 shown in FIG. 4.

According to the teachings herein, a reference motion vector may be selected so as to reduce the number of bits required to encode a motion vector determined by, for example, motion search techniques. The teachings herein take advantage of temporal motion continuity to reduce the number of bits required to transmit motion vector information by referring to motion vectors from adjacent and non-adjacent video frames. The decoder has all the information the encoder has to select the reference motion vector, allowing the selection of the reference motion vector without explicit transfer of further information.

The aspects of encoding and decoding described above illustrate some exemplary encoding and decoding techniques. However, it is to be understood that encoding and decoding, as those terms are used in the claims, could mean compression, decompression, transformation, or any other processing or change of data.

The words "example" or "implementation" are used herein to mean serving as an example, instance, or illustration. Any aspect or design described herein as "example" or "implementation" is not necessarily to be construed as preferred or advantageous over other aspects or designs. Rather, use of the words "example" or "implementation" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the transmitting station 102 and/or the receiving station 110 (and the algorithms, methods, instructions, etc., stored thereon and/or executed thereby, including by the encoder 300 and the decoder 400) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 110 do not necessarily have to be implemented in the same manner.

Further, in one aspect, for example, the transmitting station 102 or the receiving station 110 can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

The transmitting station 102 and the receiving station 110 can, for example, be implemented on computers in a video conferencing system. Alternatively, the transmitting station 102 can be implemented on a server and the receiving station 110 can be implemented on a device separate from the server, such as a hand-held communications device. In this instance, the transmitting station 102 can encode content using the encoder 300 into an encoded video signal and transmit the encoded video signal to the communications device. In turn, the communications device can then decode the encoded video signal using a decoder. Alternatively, the communications device can decode content stored locally on the communications device, for example, content that was not transmitted by the transmitting station 102. Other suitable the implementation schemes of the transmitting station 102 and the receiving station 110 are available. For example, the receiving station 110 can be a generally stationary personal computer rather than a portable communications device and/or a device including an encoder may also include a decoder.

Further, all or a portion of implementations of the present invention can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. An apparatus for decoding a video stream within an encoded bitstream, comprising:
   a processor; and
   a memory storing instructions that cause the processor to:
      determine a reference motion vector from the encoded bitstream that was used to encode a current block of a current frame, the reference motion vector selected at an encoder by:
         identifying multiple candidate motion vectors used to inter predict previously-decoded blocks;
         identifying a set of reconstructed pixel values from at least one decoded block adjacent to the current block within the current frame;
         for each candidate motion vector:
            generating, using the candidate motion vector and a first reference frame, a set of predicted pixel values for the set of reconstructed pixel values; and
            determining an error value based on a difference between the set of predicted pixel values and the set of reconstructed pixel values; and
         selecting, based on the error values, the reference motion vector from the candidate motion vectors; and
      decode the current block using the reference motion vector.

2. The apparatus of claim 1, wherein the multiple candidate motion vectors include at least a first candidate motion vector used to inter predict a first previously-decoded block using the first reference frame and a second candidate motion vector used to inter predict a second previously-decoded block using a second reference frame, and the instructions for each candidate motion vector comprise instructions that cause the processor to:
  generate, using the first candidate motion vector and the first reference frame, a first set of predicted pixel values for the set of reconstructed pixel values;
  determine a first error value of the error values based on a difference between the first set of predicted pixel values and the set of reconstructed pixel values;
  generate, using the second candidate motion vector and the first reference frame, a second set of predicted pixel values for the set of reconstructed pixel values; and
  determine a first error value of the error values based on a difference between the second set of predicted pixel values and the set of reconstructed pixel values.

3. The apparatus of claim 2, wherein the first reference frame is adjacent to the current frame within the video stream, and the second reference frame is not adjacent to the current frame within the video stream, and wherein the instructions further comprise instructions to:
  scale the second candidate motion vector before generating the second set of predicted pixel values.

4. The apparatus of claim 3, wherein the instructions to scale the second candidate motion vector comprises instructions to scale the second candidate motion vector by a number of frames between the second reference frame and the current reference frame in the video stream.

5. The apparatus of claim 2, wherein the first reference frame is not adjacent to the current frame within the video stream, and the second reference frame is adjacent to the current frame within the video stream, and wherein the instructions further comprise instructions to:
  scale the second candidate motion vector before generating the second set of predicted pixels.

6. The apparatus of claim 5, wherein the instructions to scale the second candidate motion vector comprises instructions to scale the second candidate motion vector by a number of frames between the first reference frame and the current reference frame in the video stream.

7. The apparatus of claim 2, wherein the instructions for each candidate motion vector comprise instructions that cause the processor to:
  generate, using the first candidate motion vector and the second reference frame, a third set of predicted pixel values for the set of reconstructed pixel values;
  determine a third error value of the error values based on a difference between the third set of predicted pixel values and the set of reconstructed pixel values;
  generate, using the second candidate motion vector and the second reference frame, a fourth set of predicted pixel values for the set of reconstructed pixel values; and
  determine a fourth error value of the error values based on a difference between the fourth set of predicted pixel values and the set of reconstructed pixel values.

8. The apparatus of claim 1, wherein the instructions further comprise instructions to:
  determine at least one bit included in association with the current block within the encoded bitstream that indicates that the current block was encoded using the reference motion vector.

9. The apparatus of claim 1, wherein the instructions to decode the current block using the reference motion vector comprise instructions to:
  decode a residual motion vector from the encoded bitstream;
  generate a motion vector by adding the residual motion vector to the reference motion vector; and
  decode the current block using the motion vector.

10. The apparatus of claim 1, wherein the instructions to decode the current block using the reference motion vector comprise instructions to:
  decode a magnitude of a motion vector using a probability distribution based on the reference motion vector; and
  decode the current block using the motion vector.

11. The apparatus of claim 1, wherein the instructions further comprise an instruction to:
  decode, from the encoded bitstream, a residual for the current block; and further comprise instructions to decode the current block by:
    inter predicting the current block using the reference motion vector to generate a reference block for the current block; and
    reconstructing the current block by adding the residual to the reference block.

12. A method for decoding a video stream within an encoded bitstream, comprising:
  determining a reference motion vector within the encoded bitstream that was used to encode a current block of a current frame, the reference motion vector selected at an encoder by:
    identifying, for previously-decoded blocks of the video stream, multiple candidate motion vectors used to inter predict the previously-decoded blocks;
    identifying a set of reconstructed pixel values from at least one decoded block adjacent to the current block within the current frame;
    for each candidate motion vector:
      generating, using the candidate motion vector and a first reference frame, a set of predicted pixel values for the set of reconstructed pixel values; and
      determining an error value based on a difference between the set of predicted pixel values and the set of reconstructed pixel values; and
    selecting, based on the error values, the reference motion vector from the candidate motion vectors; and
  decoding the current block using the reference motion vector.

13. The method of claim 12, further comprising:
  decoding at least one bit within the encoded bitstream indicating how the reference motion vector was used to encode the current block.

14. The method of claim 12, wherein the reference motion vector is a first candidate motion vector from the candidate motion vectors having a lowest error value.

15. The method of claim 14, wherein the error values comprise one of sums of absolute differences, sums of squared errors or mean-squared errors.

16. The method of claim 12, further comprising decoding the current block using the reference motion vector by:
  decoding a motion vector residual encoded into the encoded bitstream for the current block;
  generating a motion vector by summing the motion vector residual and the reference motion vector; and
  decoding the current block using the motion vector.

17. An apparatus for encoding a video stream into an encoded bitstream, comprising:
- a processor; and
- a memory storing instructions that cause the processor to:
    - determine a reference motion vector by:
        - identifying, for previously-decoded blocks of the video stream, multiple candidate motion vectors used to inter predict the previously-decoded blocks;
        - identifying a set of reconstructed pixel values from at least one decoded block adjacent to a current block within a current frame;
        - for each candidate motion vector:
            - generating, using the candidate motion vector and a first reference frame, a set of predicted pixel values for the set of reconstructed pixel values; and
            - determining an error value based on a difference between the set of predicted pixel values and the set of reconstructed pixel values; and
        - selecting, based on the error values, the reference motion vector from the candidate motion vectors; and
    - encode the current block into the encoded bitstream using the reference motion vector.

18. The apparatus of claim 17, wherein the previously-decoded blocks comprise at least one block adjacent to the current block within the current frame that is encoded and subsequently decoded.

19. The apparatus of claim 17, wherein the instructions further comprise instructions to:
- include at least one bit in the encoded bitstream in association with the current block that indicates that the current block was encoded using the reference motion vector.

20. The apparatus of claim 17, wherein the set of reconstructed pixel values comprises one or more rows of pixels above the current block and one or more columns of pixels to the left of the current block, and the instructions to determine the error value comprises instructions to:
- calculate a sum of absolute differences between the set of reconstructed pixel values and the set of predicted pixel values;
- calculate a sum of squared errors between the set of reconstructed pixel values and the set of predicted pixel values; or
- calculate a mean square error between the set of reconstructed pixel values and the set of predicted pixel values.

* * * * *